United States Patent
Kato

(10) Patent No.: US 10,466,078 B2
(45) Date of Patent: Nov. 5, 2019

(54) PHOTOELECTRIC ENCODER

(71) Applicant: Mitutoyo Corporation, Kawasaki, Kanagawa (JP)

(72) Inventor: Yoshiaki Kato, Chiba (JP)

(73) Assignee: MITUTOYO CORPORATION, Kawasaki (JP)

(*) Notice: Subject to any disclaimer, the term of this patent is extended or adjusted under 35 U.S.C. 154(b) by 217 days.

(21) Appl. No.: 15/699,413

(22) Filed: Sep. 8, 2017

(65) Prior Publication Data
US 2018/0073898 A1 Mar. 15, 2018

(30) Foreign Application Priority Data
Sep. 12, 2016 (JP) .................. 2016-177668

(51) Int. Cl.
*G01D 5/34* (2006.01)
*G01D 5/347* (2006.01)

(52) U.S. Cl.
CPC ..... *G01D 5/34707* (2013.01); *G01D 5/34715* (2013.01); *G01D 5/34746* (2013.01)

(58) Field of Classification Search
CPC ........... G01D 5/34707; G01D 5/34715; G01D 5/34746
USPC ................. 250/231.13, 231.14, 23.16, 205
See application file for complete search history.

(56) References Cited

U.S. PATENT DOCUMENTS 8,134,106 B2 * 3/2012 Tamegai ............. G01J 1/46
250/205

FOREIGN PATENT DOCUMENTS

JP 2013-96756 5/2013

* cited by examiner

*Primary Examiner* — Kevin K Pyo
(74) *Attorney, Agent, or Firm* — Rankin, Hill & Clark LLP

(57) ABSTRACT

An encoder includes a scale having graduations arranged in a measurement direction, a head including a light receiving unit configured to receive, via the scale, light emitted from a light source, and being configured to detect a relative movement amount with respect to the scale by relatively moving in the measurement direction of the scale, and a control unit configured to control the head. The control unit includes a light amount control unit configured to perform control so as to keep a predetermined light receiving amount by increasing or decreasing a light amount of the light source, an error determination unit configured to determine an error based on light received by the light receiving unit, and a light amount suppression unit configured to suppress a light amount of the light source by stopping control performed by the light amount control unit, when the error determination unit determines as an error.

8 Claims, 9 Drawing Sheets

PHOTOELECTRIC ENCODER

CROSS-REFERENCE TO RELATED APPLICATION

This non-provisional application claims priority under 35 U.S.C. § 119(a) from Japanese Patent Application No. 2016-177668, filed on Sep. 12, 2016, the entire contents of which are incorporated herein by reference.

BACKGROUND

Technical Field

The present invention relates to light amount control of a light source of a photoelectric encoder.

Background Art

There has been conventionally known a photoelectric encoder including a scale having graduations arranged in a measurement direction, a head including alight receiving unit configured to receive, via the scale, light emitted from a light source, and being configured to detect a relative movement amount with respect to the scale by relatively moving in the measurement direction of the scale, and a control unit configured to control the head. In such a photoelectric encoder, the light receiving unit receives light from the light source via the scale, and detects two-phase sinusoidal signals (Lissajous signals) having phases different by 90°. The photoelectric encoder detects a relative movement amount between the head and the scale based on the Lissajous signals detected by the light receiving unit. Here, there is such a problem that, if the amplitude of the Lissajous signals detected by the light receiving unit is small, noise becomes relatively large, and measurement accuracy deteriorates.

Thus, for example, an encoder described in JP 2013-096756 A includes an error detection unit configured to detect an error from an ideal Lissajous waveform that is included in a Lissajous waveform (Lissajous signal), and sets a new correction value by accumulating detected errors, and a light source driving processor configured to adjust electrical current to be supplied to a light source, according to the correction value. When an error of the Lissajous waveform is detected by the error detection unit, the light source driving processor adjusts electrical current to be supplied to the light source, to suppress deterioration in measurement accuracy. More specifically, by increasing electrical current to be supplied to the light source, to increase a light amount of the light source, the photoelectric encoder can acquire a reliable Lissajous waveform as compared with a waveform obtainable when the light amount is small.

SUMMARY OF THE INVENTION

Problems to be Solved by the Invention

Nevertheless, there is such a problem that, if the light source driving processor increases electrical current to be supplied to the light source, when the amplitude of the Lissajous waveform is small, power consumption of the light source increases.

The object of the present invention is to provide a photoelectric encoder that can achieve a reduction in the power consumption of a light source.

Means for Solving the Problems

A photoelectric encoder according to the present invention includes a scale having graduations arranged in a measurement direction, a head including a light receiving unit configured to receive, via the scale, light emitted from a light source, and being configured to detect a relative movement amount with respect to the scale by relatively moving in the measurement direction of the scale, and a control unit configured to control the head. The control unit includes a light amount control unit configured to perform control so as to keep a predetermined light receiving amount by increasing or decreasing a light amount of the light source, an error determination unit configured to determine an error based on light received by the light receiving unit, and a light amount suppression unit configured to suppress a light amount of the light source by stopping control performed by the light amount control unit, when the error determination unit determines as an error.

According to the aforementioned present invention, because the photoelectric encoder includes the error determination unit configured to determine an error based on light received by the light receiving unit, an error can be determined when an amplitude of a Lissajous signal becomes smaller, and the reliability of the photoelectric encoder declines, for example. Because the photoelectric encoder includes the light amount suppression unit configured to suppress the light amount of the light source by stopping the control performed by the light amount control unit, when the error determination unit determines as an error, the light amount control unit can be prevented from performing control so as to increase electrical current to be supplied to the light source. The light amount suppression unit can accordingly suppress control of causing excess power supply that is performed by the light amount control unit. A reduction in the power consumption of the light source can be therefore achieved.

At this time, the light amount suppression unit preferably turns off the light source when the error determination unit determines as an error.

With this configuration, because the light amount suppression unit turns off the light source when the error determination unit determines as an error, a further reduction in the power consumption of the light source can be achieved.

The light amount suppression unit preferably suppresses the light source to have a predetermined light amount, when the error determination unit determines as an error.

With this configuration, because the light amount suppression unit suppresses the light source to have the predetermined light amount, when the error determination unit determines as an error, a reduction in the power consumption of the light source can be achieved. Here, the photoelectric encoder cannot detect the Lissajous signal when the light source is turned off by the light amount suppression unit. Nevertheless, when the light source is suppressed by light amount suppression unit to have the predetermined light amount, because the light source emits light having the predetermined light amount, there is a possibility that the photoelectric encoder can detect the Lissajous signal.

At this time, it is preferable that the control unit further includes a return control unit configured to cause the light source to output light for returning control performed by the light amount control unit, as a return signal, after a light amount of the light source has been suppressed by the light amount suppression unit based on an error determined by the error determination unit, and an error redetermination unit configured to redetermine an error based on light received by the light receiving unit, and the return control unit returns control performed by the light amount control unit, when the error redetermination unit does not determine as an error.

With this configuration, because the photoelectric encoder includes the return control unit configured to cause the light source to output light for returning the control performed by the light amount control unit, as a return signal, and the error redetermination unit configured to redetermine an error based on light received by the light receiving unit, the return control unit can return the control performed by the light amount control unit, when a Lissajous signal is detected and the error redetermination unit does not determine as an error, for example.

At this time, the return control unit preferably causes the light source to output the return signal by blinking the light source.

With this configuration, even while the light source is outputting the return signal by blinking the light, a reduction in the power consumption of the light source can be achieved.

Here, when a light emitting diode (LED) is employed as the light source, because the LED has a property of deteriorating according to a total operating time, the return control unit can extend the operating life of the light source (LED) by blinking the light source. The photoelectric encoder can accordingly suppress deterioration of the light source.

At this time, the return control unit preferably causes the light source to output the return signal based on a predetermined trigger.

With this configuration, the return control unit can cause the light source to output the return signal based on the predetermined trigger. Thus, because the light amount suppression unit suppresses the light amount of the light source until the time when the return control unit causes the light source to output the return signal based on the predetermined trigger, a reduction in the power consumption of the light source can be achieved.

The return control unit preferably causes the light source to output the return signal being triggered by a relative movement of the head, after a light amount of the light source has been suppressed by the light amount suppression unit based on an error determined by the error determination unit.

With this configuration, after the light amount has been suppressed by the light amount suppression unit based on an error determined by the error determination unit, the return control unit can cause the light source to output the return signal being triggered by the relative movement of the head. Thus, because the light amount suppression unit suppresses the light amount of the light source until the time when the return control unit causes the light source to output the return signal based on the relative movement of the head, a reduction in the power consumption of the light source can be achieved.

The return control unit preferably causes the light source to output the return signal being triggered by lapse of a certain period of time, after a light amount of the light source has been suppressed by the light amount suppression unit based on an error determined by the error determination unit.

With this configuration, after the light amount of the light source has been suppressed by the light amount suppression unit based on an error determined by the error determination unit, the return control unit can cause the light source to output the return signal being triggered by the lapse of a certain period of time. Thus, because the light amount suppression unit suppresses the light amount of the light source until the time when the return control unit causes the light source to output the return signal after the lapse of a certain period of time, a reduction in the power consumption of the light source can be achieved. Because the return control unit causes the light source to output the return signal being triggered by the lapse of a certain period of time, the return control unit can automatically cause the light source to output the return signal after the lapse of a certain period of time.

DETAILED DESCRIPTION OF THE EMBODIMENTS

First Embodiment

A first embodiment of the present invention will be described below based on the drawings.

Figure 1:
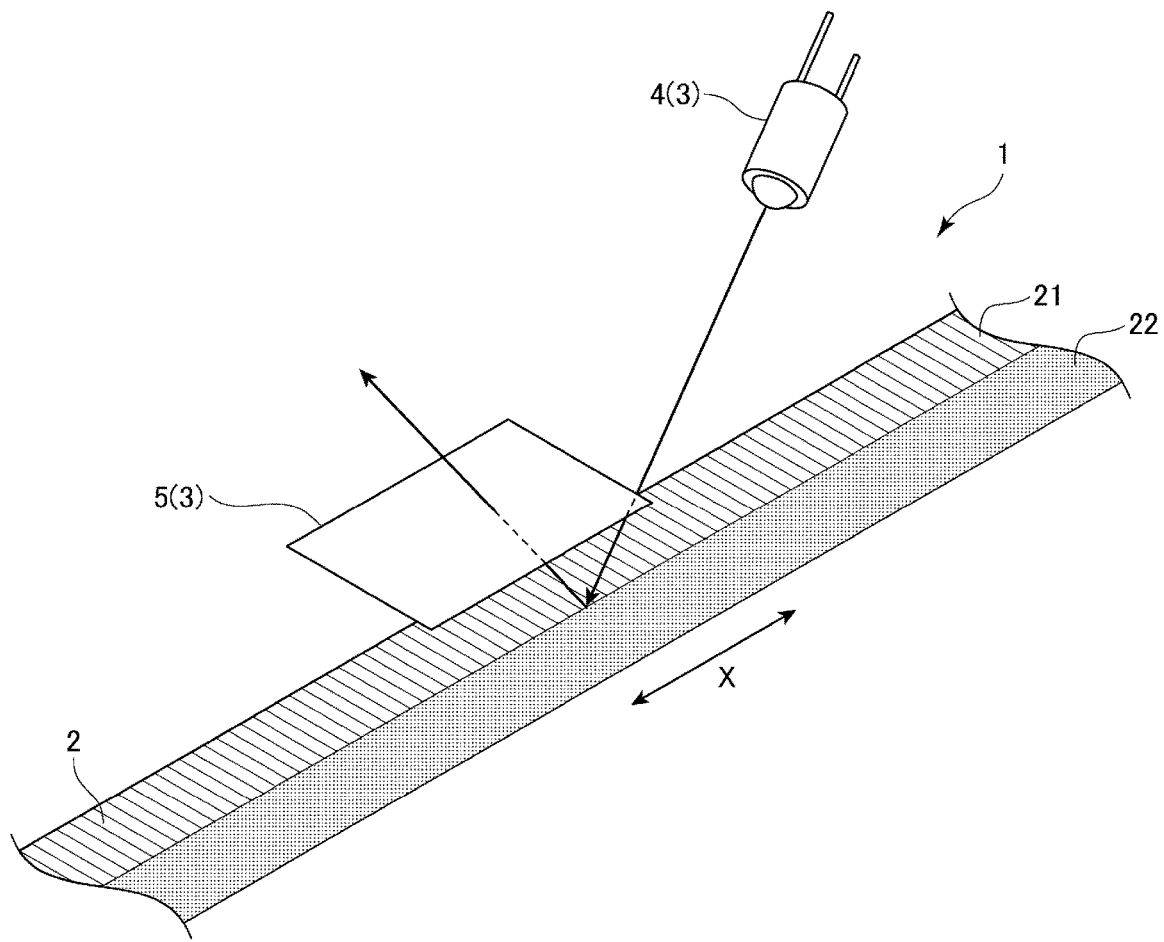
FIG. 1 is a perspective view illustrating an encoder according to a first embodiment of the present invention.

FIG. 1 is a perspective view illustrating an encoder according to the first embodiment of the present invention.

As illustrated in FIG. 1, an encoder 1 is a photoelectric linear encoder including a scale 2 having graduations arranged in a measurement direction (X direction), and a head 3 that detects a relative movement amount with respect to the scale 2 by relatively moving in the X direction of the scale 2.

In the following description, a direction equivalent to a longitudinal direction of the scale 2 and to a movement direction of the head 3 will be sometimes described as the X direction.

The scale 2 is formed of glass or the like into an elongated shape, and includes graduations 21 having an incremental pattern and graduations 22 having an absolute pattern. The incremental pattern and the absolute pattern include reflective portions and nonreflective portions alternately arranged in the X direction of the scale 2. A relative movement amount between the scale 2 and the head 3 is detected from the graduations 21 having the incremental pattern, and an absolute position is detected from the graduations 22 having the absolute pattern.

The head 3 includes a light source 4 and a light receiving unit 5.

For example, a light emitting diode (LED) is used as the light source 4, and the light source 4 emits light onto the scale 2. The light receiving unit 5 receives light via the graduations 21 or 22 of the scale 2, and converts a light amount change of the received light into an electrical signal. Then, the light receiving unit 5 detects, from the electrical signal, two-phase sinusoidal signals (Lissajous signals) having phases different by 90°. The encoder 1 detects a relative movement amount between the scale 2 and the head 3 based on the Lissajous signals detected by the light receiving unit 5. The method of converting a light amount change of light reflected via the scale 2, into an electrical signal will be hereinafter referred to as reflective photoelectric conversion.

Figure 2:
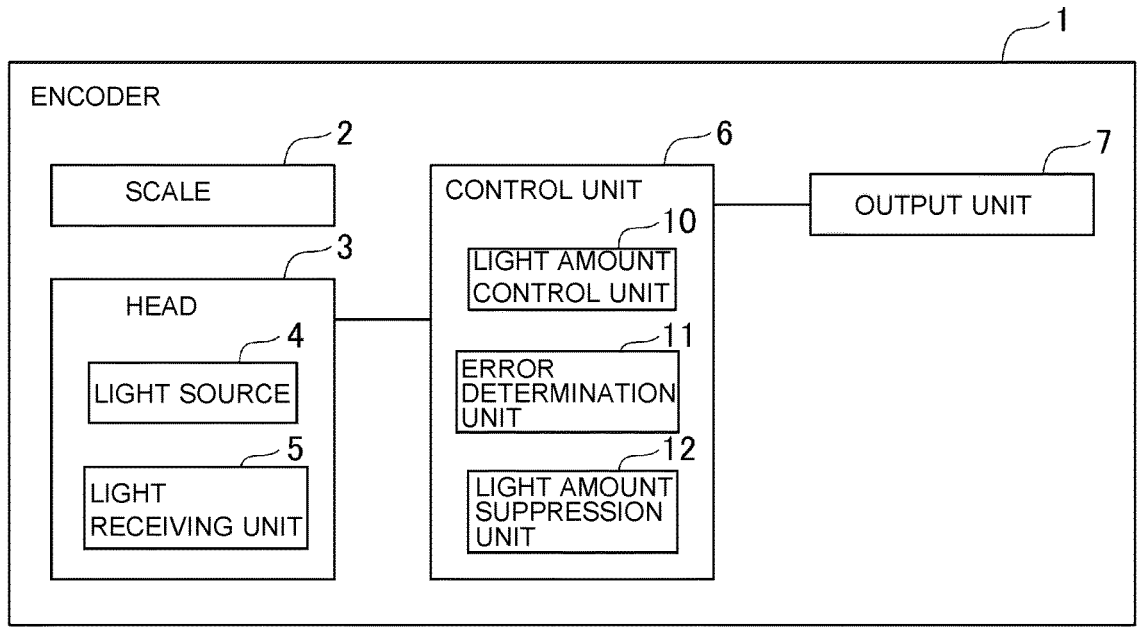
FIG. 2 is a block diagram illustrating the encoder according to the first embodiment of the present invention.

FIG. 2 is a block diagram illustrating the encoder according to the first embodiment of the present invention.

The encoder 1 further includes a control unit 6 that controls the head 3, and an output unit 7 that outputs the relative movement amount calculated by the control unit 6 based on the Lissajous signals.

The control unit 6 includes a light amount control unit 10, an error determination unit 11, and a light amount suppression unit 12. The control unit 6 calculates a relative movement amount between the scale 2 and the head 3 from the Lissajous signals detected by the light receiving unit 5.

For example, the output unit 7 outputs and displays the relative movement amount calculated by the control unit 6, on a display screen or the like of a computer connected to the encoder 1.

The light amount control unit 10 performs control so as to keep a predetermined light receiving amount, by increasing or decreasing a light amount of the light source 4. Specifically, when the magnitude of the Lissajous signal (amplitude of the Lissajous signal) becomes smaller as compared with the magnitude of a preset ideal Lissajous signal, due to dirt on the scale 2, the light amount control unit 10 increases electrical current to be supplied to the light source 4, to increase the light amount. In addition, when the magnitude of the Lissajous signal becomes larger as compared with the magnitude of the preset ideal Lissajous signal, the light amount control unit 10 decreases electrical current to be supplied to the light source 4, to decrease the light amount. In this manner, the light amount control unit 10 performs control so as to keep the predetermined light receiving amount that enables the light receiving unit 5 to detect the ideal Lissajous signal.

In the following description, the magnitude of the amplitude of the Lissajous signal will be sometimes described as the magnitude of the Lissajous signal.

The error determination unit 11 determines an error based on light received by the light receiving unit 5. Specifically, the error determination unit 11 compares a preset error determination criterion Lissajous signal, and a Lissajous signal detected by the light receiving unit 5, and determines as an error when the Lissajous signal detected by the light receiving unit 5 becomes smaller than the error determination criterion Lissajous signal. Here, an error determination criterion is set to the magnitude of a Lissajous signal that disables the light receiving unit 5 to detect a Lissajous signal. When the Lissajous signal detected by the light receiving unit 5 becomes smaller than the error determination criterion Lissajous signal, noise becomes relatively large, and measurement accuracy deteriorates. Thus, the light receiving unit 5 cannot detect a normal Lissajous signal.

The light amount suppression unit 12 suppresses the light amount of the light source 4 by stopping control performed by the light amount control unit 10, when the error determination unit 11 determines as an error. More specifically, the light amount suppression unit 12 suppresses the light amount of the light source 4 by turning off the light source 4.

Figure 3:
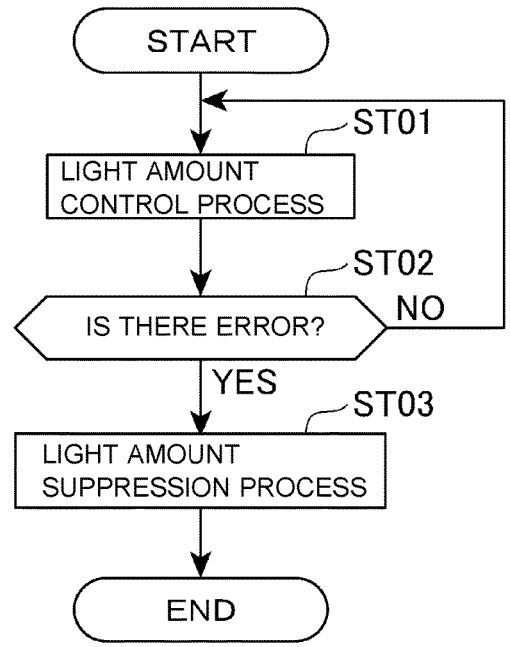
FIG. 3 is a flowchart illustrating light amount control of a light source according to the first embodiment of the present invention.

FIG. 3 is a flowchart illustrating light amount control of the light source according to the first embodiment of the present invention.

The light amount control of the light source 4 will be described below with reference to FIG. 3.

The encoder 1 first executes a light amount control process performed by the light amount control unit 10 that controls the light amount of the light source 4 (step ST01). Next, the error determination unit 11 determines whether there is an error in a Lissajous signal, based on light received by the light receiving unit 5 (step ST02).

When the error determination unit 11 determines as an error (YES in step ST02), the light amount suppression unit 12 executes a light amount suppression process of stopping the control performed by the light amount control unit 10, and turning off the light source 4 (step ST03). If the light source 4 is turned off by the light amount suppression unit 12, the light receiving unit 5 cannot detect a Lissajous signal. When the error determination unit 11 does not determine as an error (NO in step ST02), the processing returns to step ST01, and the light amount control unit 10 executes the light amount control process.

Figure 4A:
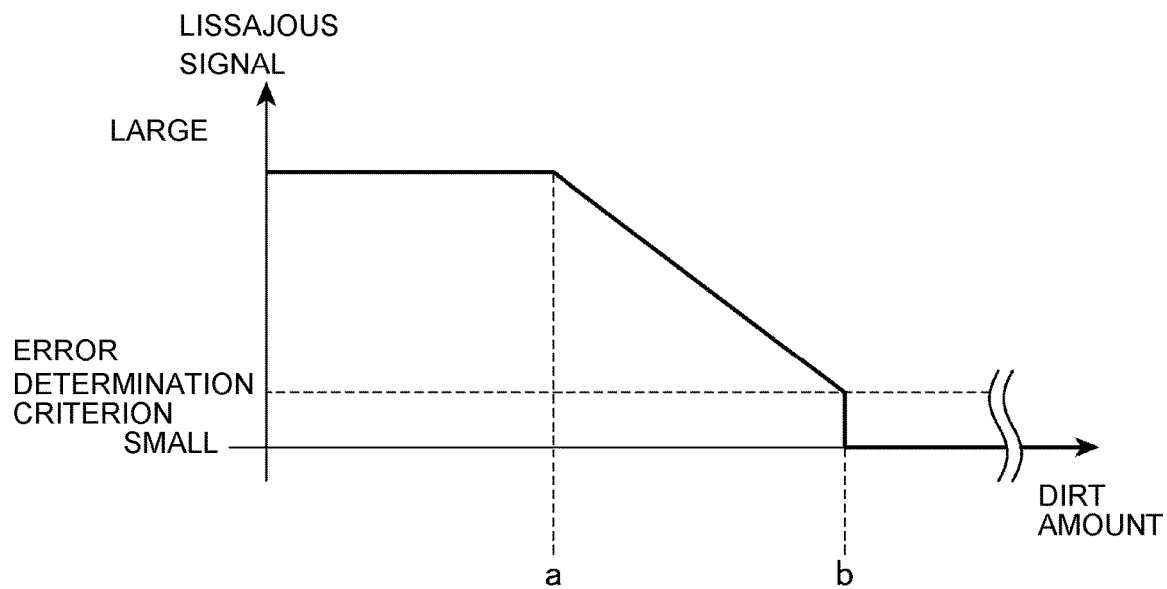
FIG. 4A illustrates a graph representing a change in the magnitude of a Lissajous signal.
Figure 4B:
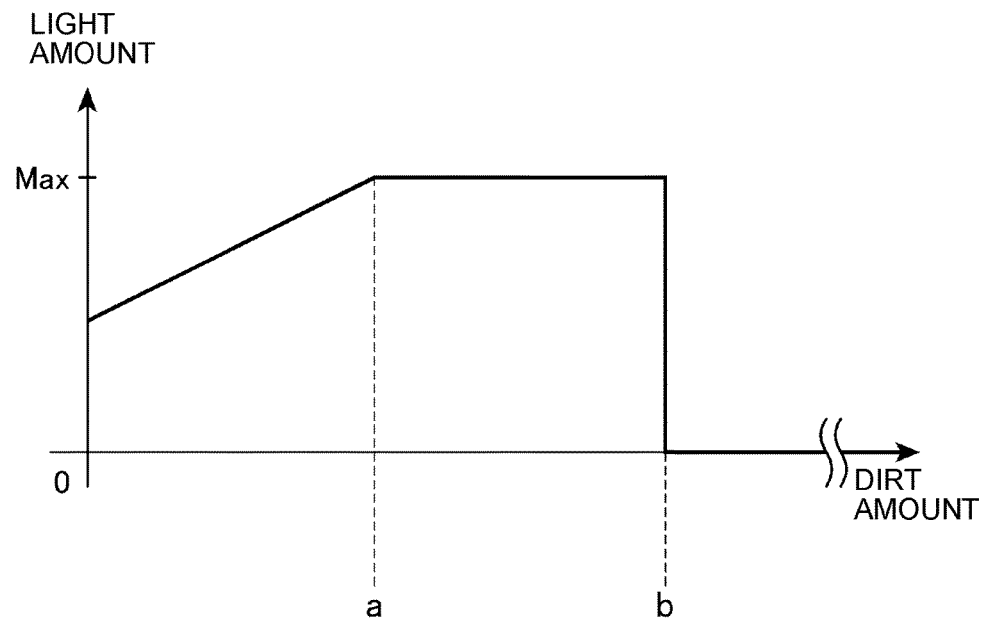
FIG. 4B illustrates a graph representing a change in a light amount of a light source.

FIGS. 4A and 4B illustrate graphs representing changes in the magnitude of the Lissajous signal, and in the light amount of the light source, according to the first embodiment of the present invention. Specifically, FIG. 4A illustrates a graph representing a change in the magnitude of the Lissajous signal, and FIG. 4B illustrates a graph representing a change in the light amount of the light source 4.

In FIG. 4A, a vertical axis represents the magnitude of the Lissajous signal, and a horizontal axis represents a dirt amount of the scale 2. In FIG. 4B, a vertical axis represents the light amount of the light source 4, and a horizontal axis represents the dirt amount similarly to FIG. 4A.

The changes in the magnitude of the Lissajous signal and in the light amount of the light source 4 will be described below with reference to FIGS. 4A and 4B.

As illustrated in FIGS. 4A and 4B, if the dirt amount of the scale 2 increases, a light amount of light received by the light receiving unit 5 decreases, so that the Lissajous signal becomes smaller. Thus, the light amount control unit 10 increases electrical current to be supplied to the light source 4, to increases the light amount, so as to keep the light amount of light received by the light receiving unit 5, constant (refer to step ST01 in FIG. 3). With this configuration, up to a dirt amount a, the light receiving unit 5 detects a normal Lissajous signal owing to the control performed by the light amount control unit 10, even if there is dirt.

If the dirt amount increases to reach the dirt amount a, because the light amount of the light source 4 has already reached a maximum light amount Max owing to the control performed by the light amount control unit 10, in accordance with the increase in the dirt amount, the light amount of light received by the light receiving unit 5 decreases, and the detected Lissajous signal becomes smaller.

When the dirt amount further increases from the dirt amount a to a dirt amount b, and the magnitude of the Lissajous signal reaches an error determination criterion at the dirt amount b, the error determination unit 11 determines as an error (YES in step ST02). Then, the light amount suppression unit 12 turns off the light source 4 at the dirt amount b (step ST03).

According to the aforementioned present embodiment, the following functions and effects are caused.

(1) Because the encoder 1 includes the error determination unit 11 configured to determine an error based on light received by the light receiving unit 5, an error can be determined when the Lissajous signal becomes smaller, and the reliability of the encoder 1 declines, for example. In addition, because the encoder 1 includes the light amount suppression unit 12 configured to suppress the light amount of the light source 4 by stopping the control performed by the light amount control unit 10, when the error determination unit 11 determines as an error, the light amount control unit 10 can be prevented from performing control so as to increase electrical current to be supplied to the light source 4. The light amount suppression unit 12 can accordingly suppress control of causing excess power supply that is performed by the light amount control unit 10. A reduction in the power consumption of the light source 4 can be therefore achieved.

(2) Because the light amount suppression unit 12 turns off the light source 4 when the error determination unit 11 determines as an error, a further reduction in the power consumption of the light source 4 can be achieved.

(3) Because the light amount suppression unit 12 controls the light source 4 to have the predetermined light amount, when the error determination unit 11 determines as an error, a reduction in the power consumption of the light source 4 can be achieved.

Instead of executing the light amount suppression process of turning off the light source 4 in step ST03 (refer to FIG. 3), the light amount suppression unit 12 may execute a light amount suppression process of suppressing light supplied by the light source 4, to have the predetermined light amount, without turning off the light source 4. Here, the predetermined light amount is preferably a light amount that is smaller than the maximum light amount Max of the light source 4, and enables the light receiving unit 5 to detect the Lissajous signal.

With this configuration, because the light source 4 emits light having the predetermined light amount, when the light amount suppression unit 12 suppresses the light source 4 to have the predetermined light amount, there is a possibility that the encoder 1 can detect the Lissajous signal.

Second Embodiment

A second embodiment of the present invention will be described below based on the drawings. In the following description, parts that have been already described are assigned the same signs, and the descriptions thereof will be omitted.

Figure 5:
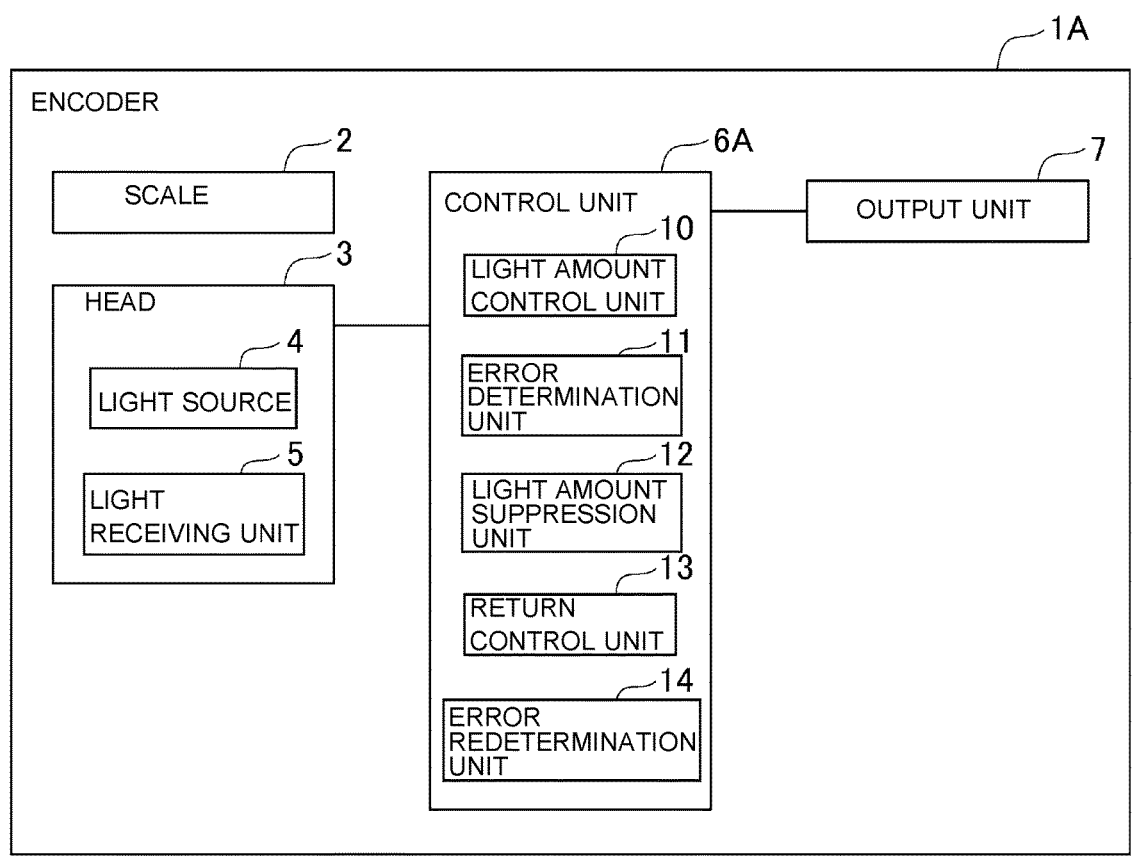
FIG. 5 is a block diagram illustrating an encoder according to a second embodiment of the present invention.

FIG. 5 is a block diagram illustrating an encoder according to the second embodiment of the present invention.

The encoder 1 according to the aforementioned first embodiment includes the control unit 6, and the control unit 6 includes the light amount control unit 10, the error determination unit 11, and the light amount suppression unit 12. In contrast to this, as illustrated in FIG. 5, an encoder 1A according to the present embodiment differs from the encoder 1 according to the aforementioned first embodiment in that the encoder 1A includes a control unit 6A, and the control unit 6A further includes a return control unit 13 and an error redetermination unit 14 in addition to the light amount control unit 10, the error determination unit 11, and the light amount suppression unit 12.

After the light amount of the light source 4 has been suppressed by the light amount suppression unit 12 based on an error determined by the error determination unit 11, the return control unit 13 causes the light source 4 to output light for returning the control performed by the light amount control unit 10, as a return signal. At this time, the return control unit 13 causes the light source 4 to output the return signal by blinking the light source 4.

The error redetermination unit 14 redetermines an error based on light received by the light receiving unit 5.

Here, the error redetermination unit 14 determines whether there is an error by comparing a Lissajous signal detected by the light receiving unit 5, using the same error determination criterion Lissajous signal as that of the error determination unit 11. Instead of using the same error determination criterion Lissajous signal as that of the error determination unit 11, the error redetermination unit 14 may use a Lissajous signal larger than the error determination criterion of the error determination unit 11, as an error determination criterion of the error redetermination unit 14, or may use a Lissajous signal smaller than the error determination criterion of the error determination unit 11, as an error determination criterion of the error redetermination unit 14.

When the light receiving unit 5 detects a Lissajous signal from the return signal, and the error redetermination unit 14 does not determine as an error, the return control unit 13 returns the control performed by the light amount control unit 10.

Figure 6:
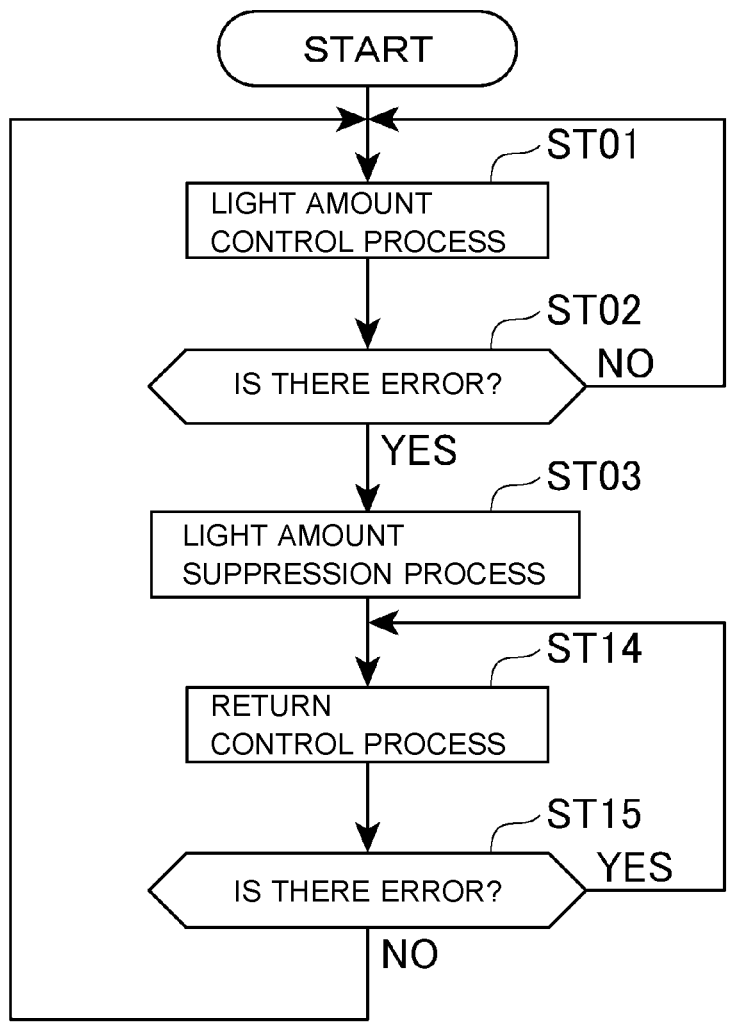
FIG. 6 is a flowchart illustrating light amount control of a light source according to the second embodiment of the present invention.
Figure 7:
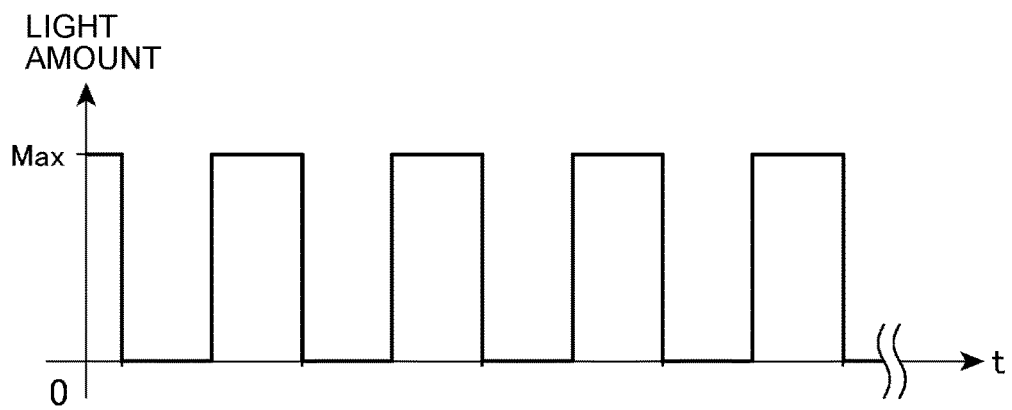
FIG. 7 illustrates a graph representing blinking of the light source according to the second embodiment of the present invention.

FIG. 6 is a flowchart illustrating light amount control of the light source according to the second embodiment of the present invention, and FIG. 7 illustrates a graph representing blinking of the light source according to the second embodiment of the present invention.

In the graph representing blinking of the light source 4 that is illustrated in FIG. 7, a vertical axis represents a light amount of the light source 4, and a horizontal axis represents a time t.

The light amount control of the light source 4 will be described below with reference to FIGS. 4A, 4B, 6, and 7.

As illustrated in FIG. 6, after the light amount suppression unit 12 has executed the light amount suppression process in step ST03, the encoder 1A first causes the return control unit 13 to execute a return control process of blinking the light source 4 to output the return signal (step ST14). As illustrated in FIGS. 4A and 4B, if the light amount suppression unit 12 executes the light amount suppression process at the dirt amount b, the light source 4 is turned off. After the light source 4 is turned off, as illustrated in FIG. 7, the return control unit 13 causes the light source 4 to output the return signal by blinking the light source 4 to have the maximum light amount Max and a minimum light amount 0 at certain intervals. At this time, the return control unit 13 causes the light source 4 to blink so as to have a rectangular waveform traveling between the maximum light amount Max and the minimum light amount 0.

As illustrated in FIG. 6, after the return control unit 13 has executed the return control process in step ST14, the error redetermination unit 14 determines whether there is an error in a Lissajous signal, based on light received by the light receiving unit 5 (step ST15). When the error redetermination unit 14 determines as an error (YES in step ST15), the processing returns to step ST14, and the return control unit 13 executes the return control process. When the error redetermination unit 14 does not determine as an error (NO in step ST15), the processing returns to step ST01, and the light amount control unit 10 returns, and executes the light amount control process.

In step ST14, the return control unit 13 causes the light source 4 to output the return signal by blinking the light source 4. Alternatively, the return control unit 13 may cause the light source 4 to output the return signal by keeping a certain light amount without blinking the light source 4. At this time, the light amount of the light source 4 is preferably a light amount that enables the light receiving unit 5 to detect a Lissajous signal.

Also in the aforementioned present embodiment, the following functions and effects are caused in addition to functions and effects similar to (1) to (3) in the aforementioned first embodiment.

(4) Because the encoder 1A includes the return control unit 13 configured to cause the light source 4 to output light for returning the control performed by the light amount control unit 10, as the return signal, and the error redetermination unit 14 configured to redetermine an error based on light received by the light receiving unit 5, the return control unit 13 can return the control performed by the light amount control unit 10, when a Lissajous signal is detected and the error redetermination unit 14 does not determine as an error.

(5) Even while the return control unit 13 is causing the light source 4 to output the return signal by blinking the light source 4, a reduction in the power consumption of the light source 4 can be achieved.

(6) By blinking the light source 4 being an LED, the return control unit 13 can extend the operating life of the light source 4. The encoder 1A can accordingly suppress deterioration of the light source 4.

Figure 8A:
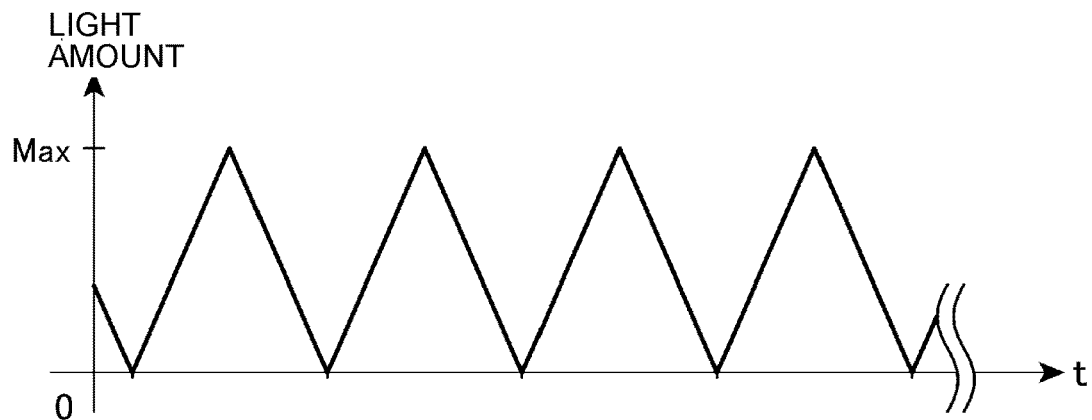
FIGS. 8A and 8B illustrate graphs representing modified examples of blinking of the light source according to the second embodiment of the present invention.
Figure 8B:
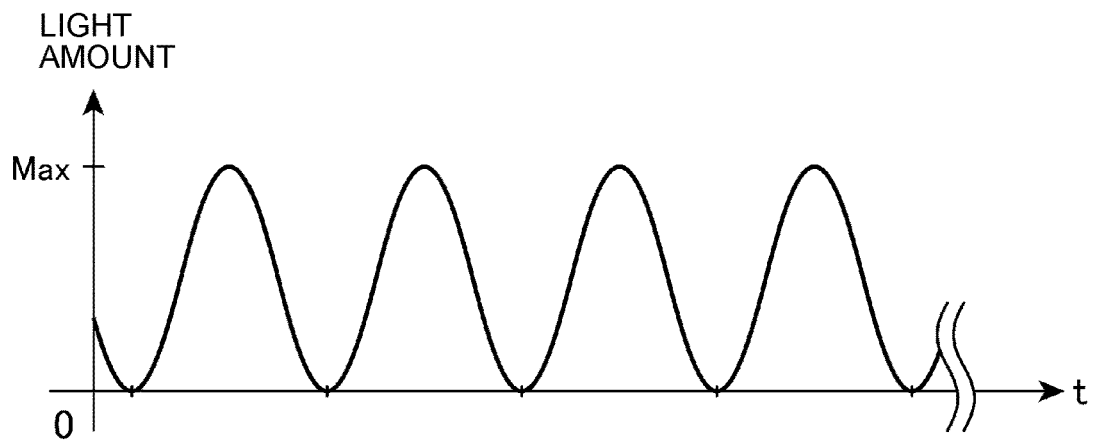

FIGS. 8A and 8B illustrate graphs representing modified examples of blinking of the light source according to the second embodiment of the present invention.

As for the blinking of the light source 4 that is caused by the return control unit 13, instead of blinking the light source 4 so as to have a rectangular waveform traveling between the maximum light amount Max and the minimum light amount 0 as illustrated in FIG. 7, the return control unit 13 may blink the light source 4 so as to have a triangular waveform traveling between the maximum light amount Max and the minimum light amount 0 as illustrated in FIG. 8A, or may blink the light source 4 so as to have a sinusoidal waveform traveling between the maximum light amount Max and the minimum light amount 0 as illustrated in FIG. 8B.

Instead of blinking the light source 4 so as to have the maximum light amount Max and the minimum light amount 0, the return control unit 13 may blink the light source 4 using a light amount smaller than the maximum light amount Max as a maximum value, and may blink the light source 4 using a light amount larger than the minimum light amount 0 as a minimum value.

Third Embodiment

A third embodiment of the present invention will be described below based on the drawings.

In the following description, parts that have been already described are assigned the same signs, and the descriptions thereof will be omitted.

Figure 9:
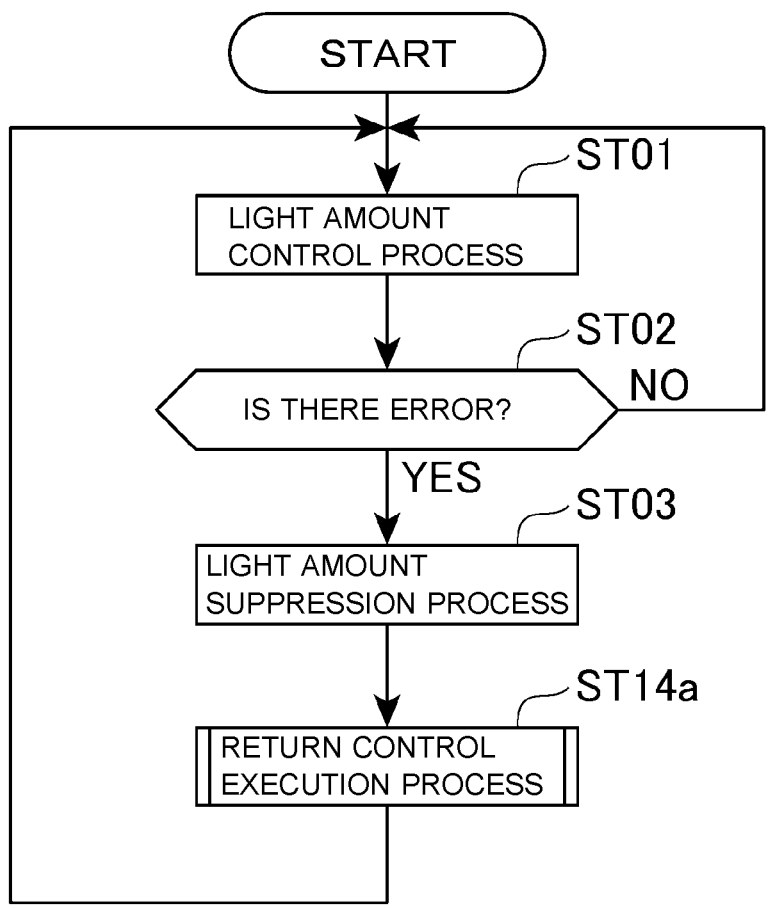
FIG. 9 is a flowchart illustrating light amount control of a light source according to the third embodiment of the present invention.

FIG. 9 is a flowchart illustrating light amount control of a light source according to the third embodiment of the present invention.

In the aforementioned second embodiment, the control unit 6A of the encoder 1A executes the return control process in step ST14. In contrast to this, a control unit 6A according to the present embodiment differs from that according to the aforementioned second embodiment in that the control unit 6A executes a return control execution process in step ST14a.

As illustrated in FIG. 9, after the light amount suppression unit 12 has executed the light amount suppression process in step ST03, the encoder 1A causes the return control unit 13 to execute the return control execution process of causing the light source 4 to output a return signal based on a predetermined trigger (step ST14a).

Figure 10:
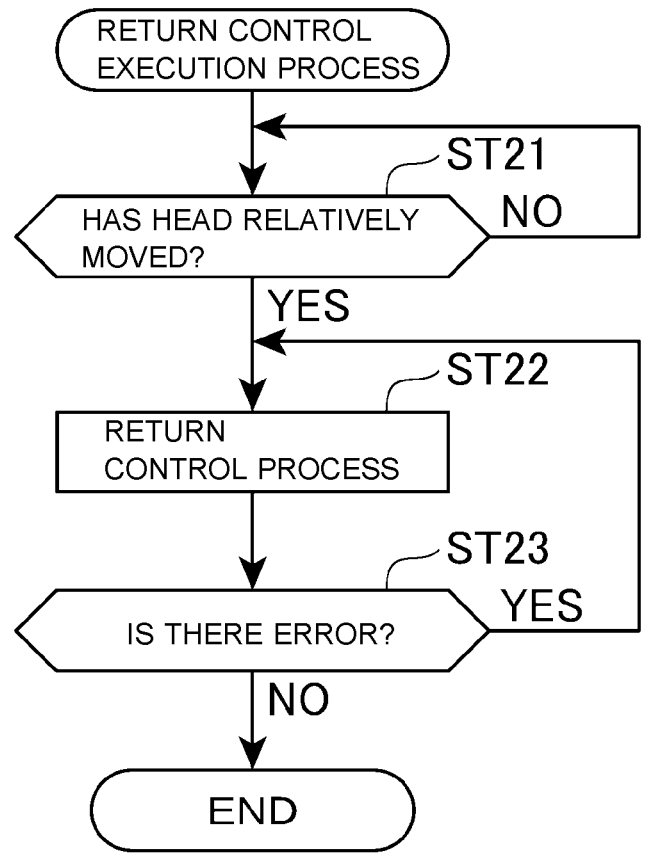
FIG. 10 is a flowchart illustrating a return control execution process according to the third embodiment of the present invention.

FIG. 10 is a flowchart illustrating the return control execution process according to the third embodiment of the present invention. Specifically, FIG. 10 is a flowchart illustrating an operation of the return control unit 13 in the return control execution process in step ST14a in FIG. 9.

As illustrated in FIG. 10, after the light amount suppression unit 12 has executed the light amount suppression process instep ST03 (refer to FIG. 9), the return control unit 13 determines whether the head 3 has relatively moved with respect to the scale 2 (step ST21). Here, a relative movement amount of the head 3 with respect to the scale 2 has been detected by the light receiving unit 5, but the light receiving unit 5 cannot determine whether the head 3 has relatively moved with respect to the scale 2 because the light amount of the light source 4 is suppressed by the light amount suppression unit 12. Thus, the return control unit 13 determines whether the head 3 has relatively moved, using, for example, an acceleration sensor mounted on the head 3. When the return control unit 13 determines that the head 3 has relatively moved (YES in step ST21), the return control unit 13 executes the return control process of causing the light source 4 to output the return signal by blinking the light source 4 (step ST22). When the return control unit 13 determines that the head 3 has not relatively moved (NO in step ST21), the processing returns to step ST21.

After the return control unit 13 has executed the return control process in step ST22, the error redetermination unit 14 determines whether there is an error in a Lissajous signal, based on light received by the light receiving unit 5 (step ST23). When the error redetermination unit 14 determines as an error (YES in step ST23), the processing returns to step ST22, and the return control unit 13 executes the return control process. When the error redetermination unit 14 does not determine as an error (NO in step ST23), the return control unit 13 ends the return control execution process.

Also in the aforementioned present embodiment, the following functions and effects are caused in addition to functions and effects similar to those in the aforementioned first and second embodiments.

(7) The return control unit 13 can cause the light source 4 to output the return signal based on the predetermined trigger. Thus, because the light amount suppression unit 12 suppresses the light amount of the light source 4 until the time when the return control unit 13 causes the light source 4 to output the return signal based on the predetermined trigger, a reduction in the power consumption of the light source 4 can be achieved.

(8) After the light amount has been suppressed by the light amount suppression unit 12 based on an error determined by the error determination unit 11, the return control unit 13 can cause the light source 4 to output the return signal being triggered by the relative movement of the head 3. Thus, because the light amount suppression unit 12 suppresses the light amount of the light source 4 until the time when the return control unit 13 causes the light source 4 to output the return signal based on the relative movement of the head 3, a reduction in the power consumption of the light source 4 can be achieved.

In the return control execution process in step ST14a, the return control unit 13 determines in step ST21 whether the head 3 has relatively moved. Alternatively, in the return control execution process, the return control unit 13 may determine whether a certain period of time has elapsed.

Figure 11:
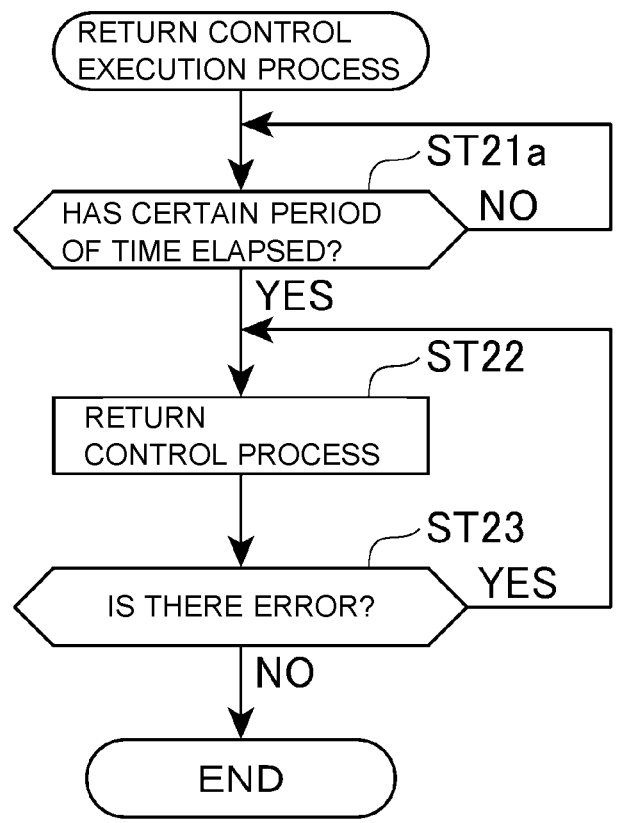
FIG. 11 is a flowchart illustrating a modified example of a return control execution process according to the third embodiment of the present invention.

FIG. 11 is a flowchart illustrating a modified example of a return control execution process according to the third embodiment of the present invention.

As illustrated in FIG. 11, after the light amount suppression unit 12 has executed the light amount suppression process instep ST03 (refer to FIG. 9), the return control unit 13 determines whether a certain period of time has elapsed (step ST21a).

When the return control unit 13 determines that a certain period of time has elapsed (YES in step ST21a), the return control unit 13 executes the return control process of causing the light source 4 to output the return signal by blinking the light source 4 (step ST22). When the return control unit 13 determines that a certain period of time has not elapsed (NO in step ST21a), the processing returns to step ST21a.

With this configuration, after the light amount of the light source 4 has been suppressed by the light amount suppression unit 12 based on an error determined by the error determination unit 11, the return control unit 13 can cause the light source 4 to output the return signal being triggered by the lapse of a certain period of time. Because the light amount suppression unit 12 suppresses the light amount of the light source 4 until the time when the return control unit 13 causes the light source 4 to output the return signal after the lapse of a certain period of time, a reduction in the power consumption of the light source 4 can be achieved. In addition, because the return control unit 13 causes the light source 4 to output the return signal being triggered by the lapse of a certain period of time, the return control unit 13 can automatically cause the light source 4 to output the return signal after the lapse of a certain period of time.

Modification of Embodiments

The present invention is not limited to the aforementioned embodiments, and modifications, alterations, and the like that fall within the scope capable of accomplishing the object of the present invention are included in the present invention.

For example, in the aforementioned embodiments, the description has been given of a case in which the present invention is used in the encoder 1 or 1A using a photoelectric linear encoder as an example. Alternatively, the encoders 1 and 1A may be rotary encoders. In addition, the present invention can be used in other measuring devices and the like, and a device on which the present invention is to be implemented is not especially limited.

In the aforementioned embodiments, the encoder 1 or 1A has been described as a reflective photoelectric encoder in which the light receiving unit 5 receives light reflected by the graduations 21 or 22 of the scale 2. Alternatively, the encoder 1 or 1A may be a transmissive photoelectric encoder in which the scale 2 includes the graduations 21 and 22 having transmissive portions and non-transmissive portions, and the light receiving unit 5 receives light transmitted through the transmissive portions of the graduations 21 or 22. The scale 2 includes the graduations 21 having an incremental pattern and the graduations 22 having an absolute pattern. Nevertheless, the scale 2 is only required to include graduations, and the type of a detector, a detection method, and the like are not especially limited.

INDUSTRIAL APPLICABILITY

As described above, the present invention can be preferably used in light amount control of a light source of a photoelectric encoder.

What is claimed is:

1. A photoelectric encoder comprising:
   a scale having graduations arranged in a measurement direction;
   a head including a light receiving unit configured to receive, via the scale, light emitted from a light source, and being configured to detect a relative movement amount with respect to the scale by relatively moving in the measurement direction of the scale; and
   a control unit configured to control the head,
   wherein the control unit includes:
   a light amount control unit configured to perform control so as to keep a predetermined light receiving amount by increasing or decreasing a light amount of the light source;
   an error determination unit configured to determine an error based on light received by the light receiving unit; and
   a light amount suppression unit configured to suppress a light amount of the light source by stopping control performed by the light amount control unit, when the error determination unit determines as an error.

2. The photoelectric encoder according to claim 1, wherein the light amount suppression unit turns off the light source when the error determination unit determines as an error.

3. The photoelectric encoder according to claim 1, wherein the light amount suppression unit suppresses the light source to have a predetermined light amount, when the error determination unit determines as an error.

4. The photoelectric encoder according to claim 1, wherein the control unit further includes:
   a return control unit configured to cause the light source to output light for returning control performed by the light amount control unit, as a return signal, after a light amount of the light source has been suppressed by the light amount suppression unit based on an error determined by the error determination unit; and
   an error redetermination unit configured to redetermine an error based on light received by the light receiving unit, and
   wherein the return control unit returns control performed by the light amount control unit, when the error redetermination unit does not determine as an error.

5. The photoelectric encoder according to claim 4, wherein the return control unit causes the light source to output the return signal by blinking the light source.

6. The photoelectric encoder according to claim 4, wherein the return control unit causes the light source to output the return signal based on a predetermined trigger.

7. The photoelectric encoder according to claim 6, wherein the return control unit causes the light source to output the return signal being triggered by a relative movement of the head, after a light amount of the light source has been suppressed by the light amount suppression unit based on an error determined by the error determination unit.

8. The photoelectric encoder according to claim 6, wherein the return control unit causes the light source to output the return signal being triggered by lapse of a certain period of time, after a light amount of the light source has been suppressed by the light amount suppression unit based on an error determined by the error determination unit.

* * * * *